United States Patent [19]

Baxter

[11] 4,418,999
[45] Dec. 6, 1983

[54] SYNCHRONIZING CIRCUIT

[75] Inventor: Barry J. Baxter, Werribee, Australia

[73] Assignee: Commonwealth of Australia, Canberra, Australia

[21] Appl. No.: 353,170

[22] Filed: Apr. 1, 1982

[30] Foreign Application Priority Data

Mar. 26, 1981 [AU] Australia .............................. PE8168

[51] Int. Cl.$^3$ .......................... G01P 3/66; G03B 15/16
[52] U.S. Cl. .................................... 354/132; 324/179; 354/266
[58] Field of Search ............... 354/129, 131, 132, 137, 354/266; 307/120; 324/179

[56] References Cited

U.S. PATENT DOCUMENTS 2,382,981  8/1945  Edgerton ...................... 354/132 X
3,127,768  4/1964  Mason ............................. 324/179 X Primary Examiner—Michael L. Gellner
Attorney, Agent, or Firm—Dennison, Meserole, Pollack & Scheiner

[57] ABSTRACT

A synchronizing circuit is disclosed which enables a desired phenomena to occur, such as the discharge of a flash illuminating means at a precise point along the path of travel of an article irrespective of the speed of the article in that path.

The circuit utilizes two spaced sensors upstream of the precise point. The sensors are operable to detect the passage of the article and each sensor is connected to respective counter. When sensor detects the passage of the article it starts its respective counter counting in one direction at one particular counting rate. When the second sensor detects the passage of the article it causes its respective counter to count in the opposite direction from the value of the count in the first count at a different but faster counting rate. The circuit includes gate means which determine when the count has returned to a predetermined count to then cause said phenomena to occur.

8 Claims, 5 Drawing Figures

SYNCHRONIZING CIRCUIT

FIELD OF THE INVENTION

This invention relates to a synchronisation circuit and relates particularly but not exclusively to a synchronisation circuit used in the art of photographing projectiles, such as bullets, so as to illuminate a projectile at a precise point in its path, regardless of the velocity of the projectile.

The circuit is generally applicable to cause any desired phenomena to be initiated at a precise point in the path of travel of an article, regardless of the velocity of the article.

PRIOR ART

In the art of photographing projectiles such as bullets it has been very difficult to ascertain exactly when the projectile reaches the field of view of the camera. Therefore, it has sometimes been the practice to either run the camera continuously if it is a movie camera and to continuously illuminate the area within the field of view of the camera during the whole of the time of travel of the projectile. This results in a waste of film and prolonged used of the illuminating lamps which have a rather short life expectancy. This prolonged use, in turn, requires that the lamps be replaced more frequently than if the area within the field of view of the camera is illuminated only when the projectile is within that area. If the camera is a still camera, then it is important that the shutter of the camera be released exactly when the projectile is within the field of view of the camera. The correct timing of these functions has been difficult. This is because the precise velocity of an individual bullet is unknown before it is discharged. If the precise velocity were known, then it would be a simple matter to calculate the time take after discharge to reach a given point and hence the camera and the lamps could be activated at that time. The problem is further complicated in that distinctly different velocity projectiles may be required to be photographed one after the other and therefore a totally different time setting is required.

Accordingly it is an object of the invention to provide a synchronizing circuit to cause a phenomena to occur at a precise point in the path of travel of an article, irrespective of the speed of movement of that article.

STATEMENT OF THE INVENTION

Therefore in accordance with a broad aspect of the present invention there is provided a synchronising circuit for causing a phenomena to occur at a precise point in the path of travel of an article regardless of the speed of movement of the article in that path, comprising first and second spaced sensors upstream of said precise point and operable to detect the passage of an article therepast and to provide output signals consequent thereon, a counting circuit which provides a count in one direction when the first sensor provides an output signal, and which counts in the opposite direction from the value of the count first counted, when the second sensor provides an output signal and circuit means responsive to the counting circuit returning to a predetermined count to initiate the occurrence of said phenomena.

Most preferably the article is a bullet and the phenomena is illumination of the bullet by a suitable flash unit. It is also preferred that the sensors be magnetic sensors.

BRIEF DESCRIPTION OF DRAWINGS

In order that the invention can be more clearly ascertained a preferred embodiment for use in high speed movie photography of a bullet will now be described with reference to the accompanying drawings wherein.

DESCRIPTION OF PREFERRED EMBODIMENTS

Figure 1:
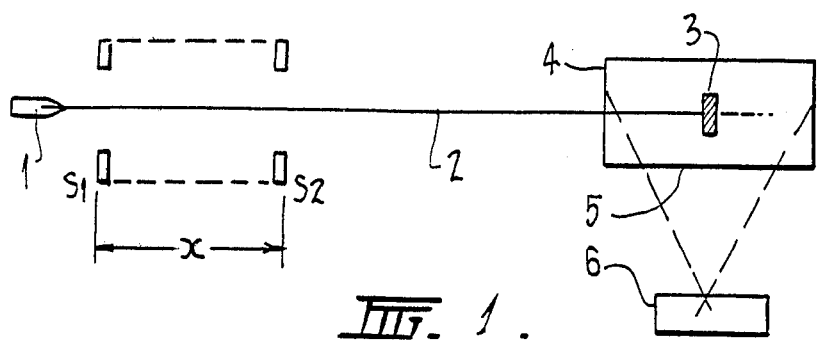
FIG. 1 is a schematic diagram of a system used for taking movie film of a bullet as it passes a particular location.

Referring firstly to FIG. 1 there is shown a bullet 1 travelling along a trajectory 2 towards a target 3 mounted within a catcher box 4. The catcher box 4 has a window or opening 5 therein at one side so that a cine camera 6 can photograph the bullet passing through the catcher box 4 and striking the target 3. The cine camera 6 includes a known flash illuminating means not shown. Two sensors $S_1$ and $S_2$ are placed upstream from the catcher box 4 and the sensors $S_1$ and $S_2$ are placed apart a known distance X. The sensors $S_1$ and $S_2$ are connected with an electronic circuit used for synchronising the occurrence of the flash to illuminate the projectile when it is in the field of view of the camera 6 within the catcher box 4. The synchronising circuit may also be used to start the operation of the cine camera 6 if desired.

Figure 2:
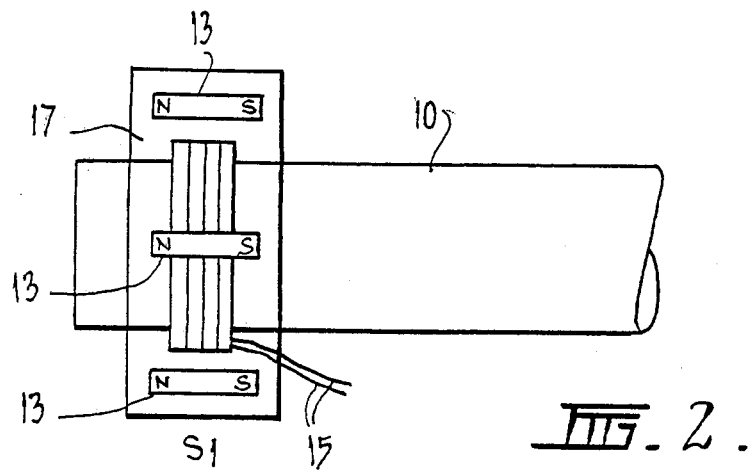
FIG. 2 is a diagrammatic view of part of a sensing head used for sensing the passing of a bullet.

The sensors $S_1$ and $S_2$ are electromagnetic sensors which detect the disturbance in the field which emanates from each, consequent on the passage of the bullet therepast. The sensors $S_1$ and $S_2$ are hollow sensors and the trajectory 2 of the bullet 1 passes therethrough. A typical sensor construction is shown in FIG. 2 where only sensor $S_1$ is shown. Sensors $S_1$ and $S_2$ are mounted on a common supporting member 10 which is a plastics material tube, 700 millimeters long. Sensor $S_1$ is provided at one end and sensor $S_2$ provided at the other end. The diameter of the plastics tube is 110 millimeters. Each coil comprises 500 turns of 32 g copper wire. The winding extends over 10 millimeters of length of the longitudinal extent of the member 10. The distance between the centres of each of the coils $S_1$ and $S_2$ is 600 millimeters. Fifteen 75 millimeter long bar magnets 13 are mounted centrally over each coil and equispaced around the circumference thereof. North like poles are arranged to be at one end of the coil. Two coaxial cables terminate with the coil winding tails 15 and connect each of the sensor coils $S_1$ and $S_2$ to the electronic circuitry. The supporting member 10 may be arranged and held in the required position by bracket means not shown. In order to provide robustness to the coils and magnets they are encapsulated in a silicone rubber compound shown generally by the numeral 17.

Sensor $S_1$ is a sensor which starts a first counter in an 'up' direction and sensor $S_2$ is a sensor which starts a second counter which counts in the opposite direction to that of the first counter—'down'—so that when that counter reaches a known value—in this case zero—then the flash 6 can be initiated. The distance of sensor $S_2$ from the catcher box 4 is a known distance having regard to the rates of counting of the first and second counters.

The velocities of the bullet 1 are in the range of 1000 to 2000 m/s. Thus, it can be seen that if the distance X is 600 milimeters and the 'up' counter (triggered in response to sensor $S_1$ operating) runs at one constant rate and the 'down' counter (which is triggered by $S_2$) runs at a faster but constant rate, that the total time of counting will vary in proportion to the bullet velocity and thus produce a trigger pulse at a constant distance from the detectors $S_1$ and $S_2$ irrespective of the velocity of the bullet 1. This is shown in the table below.

| Velocity | time over 600 mm | time count down | Total | Dist |
|---|---|---|---|---|
| 1000 m/s (1 mm/$\mu$S) | 600 $\mu$S | 250 $\mu$S | 850 $\mu$S | 850 mm |
| 2000 m/s (2 mm/$\mu$S) | 300 $\mu$S | 125 $\mu$S | 125 $\mu$S | 850 mm |

Figure 3C:
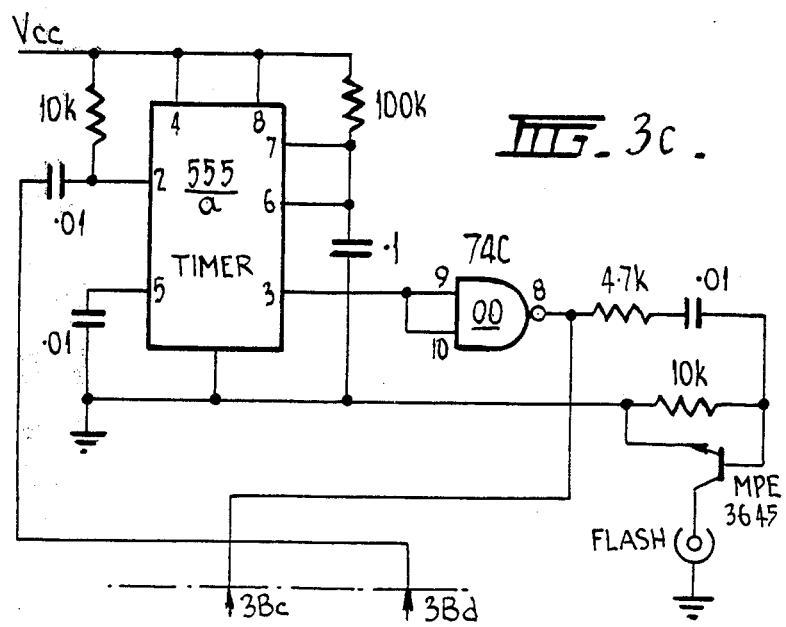
FIGS. 3a, 3b and 3c are a detailed circuit diagram of a preferred electronic circuit.
Figure 3A:
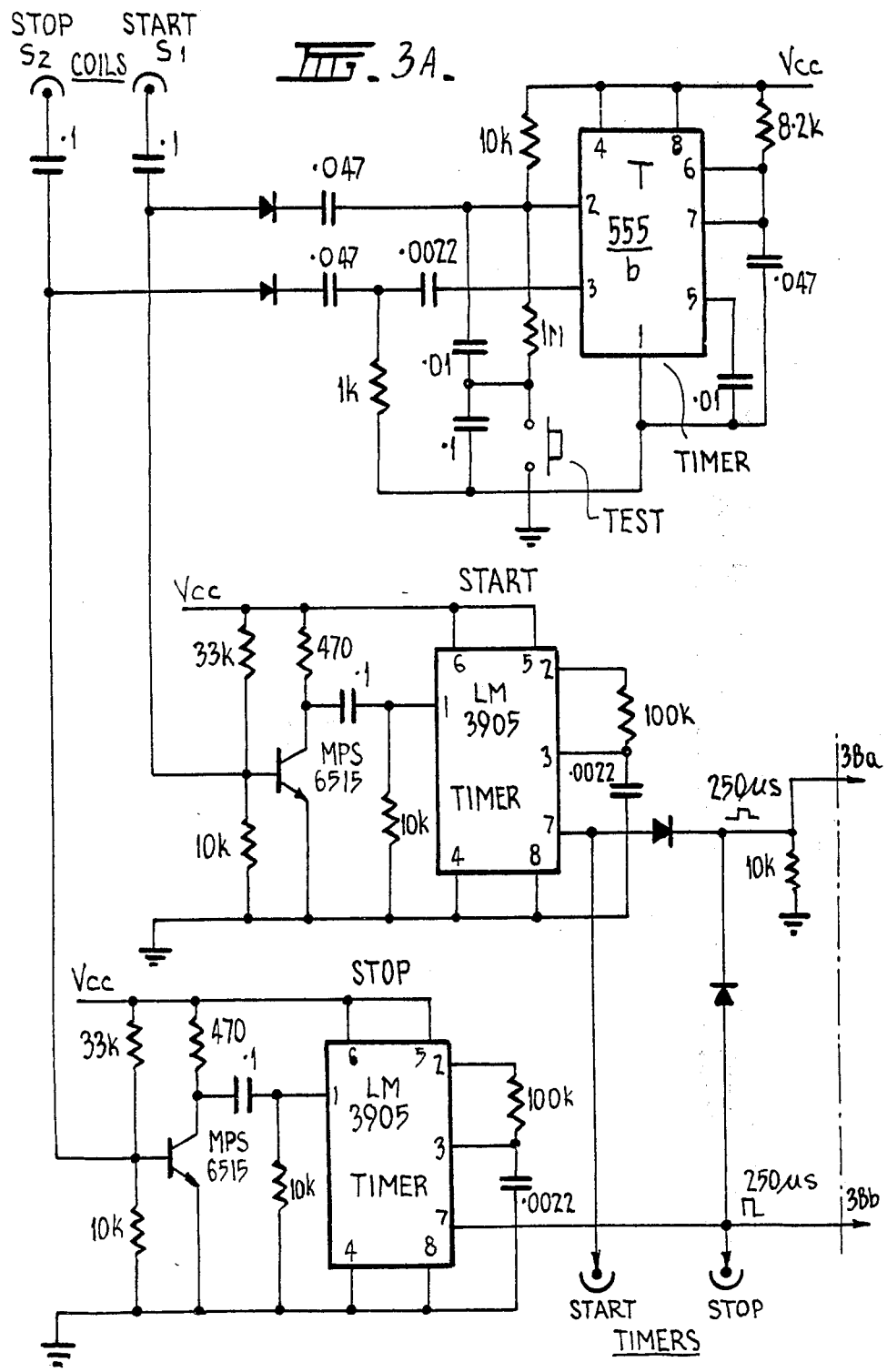
Figure 3B:
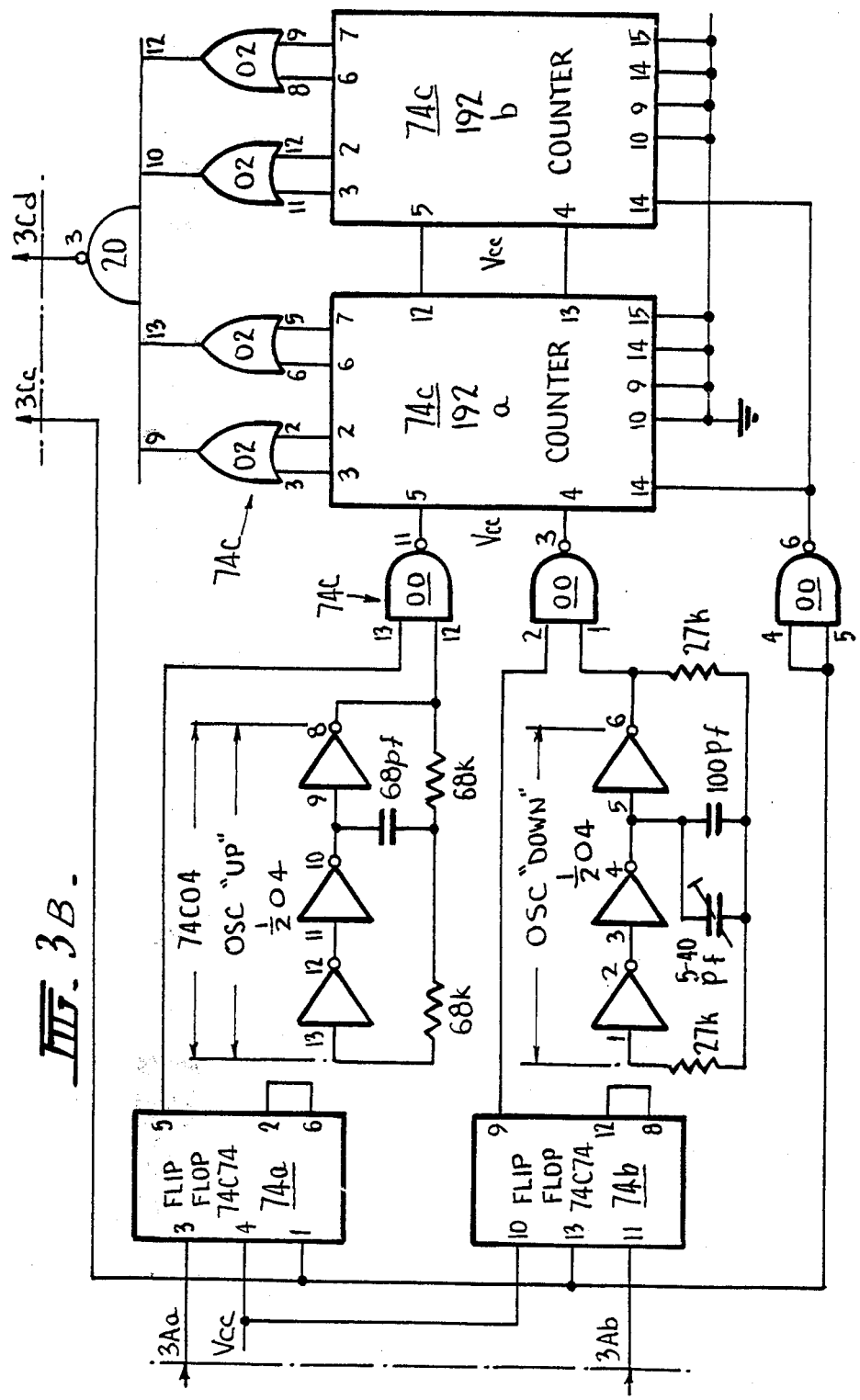

The electronic circuit shown in FIG. 3 operates as follows. The start and stop pulses from the sensors $S_1$, $S_2$ are taken to flip flop 74A and 74B type DM 7474, through single stage amplifiers type MPS 6515 and then through timers type LM 3905. These timers produce pulses of 250 $\mu$s each which are then fed to the flip flop 74A and 74B. The outputs of these determine when pulses from two oscillators 04 'up' and 04 'down' are fed to an up/down counter 192A and 192B forming part of the circuit of the flip flop 74A and 74B. While the bullet 1 is passing between the sensors $S_1$, $S_2$ the counter 192A and 192B is counting 'up' at a rate determined by the 04 up oscillator type DM 7404. On passing the second sensor $S_2$ only the 04 'down' oscillator type is connected and the counter then counts down at a new rate of the 04 down counter. A zero coincidence detector type on the output of the counter comprising the 02 and 20 gates, determines when the counter has reached zero. This zero condition is the correct point for the flash initiation and this is achieved by triggering the output of timer type 555A, through gate 00, and this operates the transistor switch type MPS 3645 to fire the flash unit. The 00 gate output pulse is also fed back to flip-flop 74A, 74B and the counter 192, automatically resetting them to initial conditions for the next shot.

A test circuit T is provided and comprises a second timer type 555B which is incorporated to generate artificially simulated coil pulses which are applied to the circuit. The result is a fixed time indication by the circuit and triggering of the electronic flash.

Modifications may be made to the invention as for example, instead of the sensors $S_1$, $S_2$ being hollow coils through which the bullet is fired, they may comprise other sensors suitable for detecting the passage of a projectile. It is noted however, that as the two coils $S_1$, $S_2$ are identical, the fields emanating from each will be substantially identical and therefore the distance X between the coils $S_1$, $S_2$ is a measure of the distance when the bullet disturbs the field of each sufficient to cause a trigger pulse to be provided at a particular level. This pulse wil be generated by each, consequent on the bullet reaching the same magnetic strength position of the field around each of the respective sensors $S_1$, $S_2$. As each sensor $S_1$, $S_2$ is identical the distance X between the coils is a measure of the distance between those points on the respective fields.

In an alternative embodiment, the sensors $S_1$, $S_2$ may comprise a sheet of plastics material coated with an electrically conductive medium whereby the electrostatic charge, which is provided on the surface of the bullet 1 consequent on its passage through the air, is detected and used to start the operation of the counters.

These and other modifications may be made without departing from the ambient of the invention the nature of which is to be determined from the foregoing description.

I claim:

1. A synchronising circuit for causing a phenomena to occur at a precise point in the path of travel of an article regardless of the speed of movement of the article in that path, comprising first and second spaced sensors upstream of said precise point and each operable to detect the passage of an article therepast and to provide output signals consequent thereon, a counting circuit which provides a count in one direction when the first sensor provides an output signal, and which counts in the opposite direction from the value of the count first counted, when the second sensor provides an output signal and circuit means responsive to the counting circuit returning to a predetermined count value to initiate the occurrence of said phenomena.

2. A synchronising circuit as claimed in claim 1 wherein said counting circuit comprises two seperate counting means, one being for counting in said one direction and the other being for counting in said opposite direction and where said circuit means responsive to the said counting circiut includes a zero coincidence detector connected to the outputs of each of said separate counting means whereby to provide an output signal usable to initiate the occurrence of said phenomena when a zero coincidence is detected.

3. A synchronising circuit as claimed in claim 1 or claim 2 wherein said first and second spaced sensors comprise electromagnetic sensors.

4. A synchronising circuit as claimed in claim 3 wherein said electromagnetic sensors each comprise a coil which, in use, has a field which eminates therefrom into the path of travel of said article and wherein said counting circuit is actuated by each sensor detecting a disturbance of said field respectively, consequent on the passage of an article therepast.

5. A synchronising circuit as claimed in claim 4 wherein both of said coils are mounted on a common supporting member to positively support and hold each apart in a position where said article will pass each at approximatley the same distance therefrom.

6. A synchronising circuit as claimed in claim 2 wherein the one of said two counting means which is first activated on the passing of the article, counts at a slower rate than the other of said two counting means.

7. A synchronising circuit as claimed in claim 1 wherein said article is a fired bullet and said phenomena is illumination of said bullet when it reaches a predetermined position, said circuit further comprising a lamp means for so illuminating said bullet and a trigger circuit activatable by said circuit means responsive to the counting circuit.

8. A synchronising circuit as claimed in any one of the preceding claims assembled with a camera and an illuminating means whereby to film an article moving past said first and second sensors when it reaches a precise point in its path of travel.

* * * * *